(12) United States Patent
Schweizer et al.

(10) Patent No.: US 11,185,907 B2
(45) Date of Patent: Nov. 30, 2021

(54) PRESS RING WITH ELONGATED HOLES

(71) Applicant: Von Arx AG, Sissach (CH)

(72) Inventors: Beat Schweizer, Titterten (CH); Andreas Stucki, Gelterkinden (CH); Marianne Heer, Sissach (CH)

(73) Assignee: Von Arx AG, Sissach (CH)

( * ) Notice: Subject to any disclaimer, the term of this patent is extended or adjusted under 35 U.S.C. 154(b) by 199 days.

(21) Appl. No.: 16/468,732

(22) PCT Filed: Dec. 19, 2017

(86) PCT No.: PCT/EP2017/083528
§ 371 (c)(1),
(2) Date: Jun. 12, 2019

(87) PCT Pub. No.: WO2018/114942
PCT Pub. Date: Jun. 28, 2018

(65) Prior Publication Data
US 2020/0009637 A1    Jan. 9, 2020

(30) Foreign Application Priority Data
Dec. 21, 2016  (EP) ..................................... 16205750

(51) Int. Cl.
*B21D 39/04*    (2006.01)
*B25B 27/10*    (2006.01)

(52) U.S. Cl.
CPC ............ *B21D 39/048* (2013.01); *B25B 27/10* (2013.01)

(58) Field of Classification Search
CPC ........ B21D 39/048; B21D 7/06; B21D 41/04; B21D 39/04; B25B 27/10; F16L 2013/145; B23P 19/04; B23P 11/00; B21J 9/18
See application file for complete search history.

(56) References Cited

U.S. PATENT DOCUMENTS

| 4,666,138 A | 5/1987 | Dearman |
| 6,405,411 B1 * | 6/2002 | Allemann .............. B21D 39/04 24/19 |

(Continued)

FOREIGN PATENT DOCUMENTS

| EP | 0791433 | 8/1997 |
| EP | 1649948 | 8/2008 |
| EP | 2323782 | 9/2012 |

OTHER PUBLICATIONS

CN Search Report dated Mar. 17, 2020; Application CN 2017800795636; 3 pages.

(Continued)

*Primary Examiner* — Lawrence Averick
(74) *Attorney, Agent, or Firm* — Mark E. Bandy; Rankin Hill & Clark, LLP

(57) ABSTRACT

A press ring (1) for pressing tubular workpieces (35), comprising: at least two movable press jaws (3); and at least one connecting press jaw (5) connecting the movable press jaws (3); wherein the movable press jaws (3) are each hinged at their proximal ends to the connecting press jaw (5) by means of respective bolts (9), so that the distal ends (7) of the movable press jaws (3) can be rotated towards and away from each other to close respectively open the press ring (1) to receive a workpiece (35) therein, and characterized in that the respective bolts (9) are arranged in elongated holes (11), allowing a translational displacement of the bolts (9) in the elongated holes (11) upon rotating the movable press jaws (3).

19 Claims, 3 Drawing Sheets

(56) References Cited

U.S. PATENT DOCUMENTS

| | | | | |
|---|---|---|---|---|
| 7,788,779 B2* | 9/2010 | Frenken | ................. | B25B 27/10 |
| | | | | 29/237 |
| 8,782,863 B2* | 7/2014 | Pfeiffer | ................. | B25B 27/10 |
| | | | | 29/237 |
| 9,015,916 B2* | 4/2015 | Frenken | ............... | F16L 13/141 |
| | | | | 29/237 |
| 2013/0025101 A1* | 1/2013 | Pfeiffer | ................. | B25B 27/10 |
| | | | | 29/237 |
| 2017/0225218 A1* | 8/2017 | Cho | ....................... | F16L 23/04 |

OTHER PUBLICATIONS

CN Office Action dated Mar. 17, 2020; Application CN 2017800795636; 9 pages.
Extended European Search Report dated Jun. 9, 2017; Application EP 16205750.9; 5 pages.

* cited by examiner

PRESS RING WITH ELONGATED HOLES

1. FIELD OF THE INVENTION

The present invention relates to a press ring and a method for pressing tubular workpieces, in particular a press ring which comprises elongated holes to connect at least two movable press jaws with at least one connecting press jaw.

2. TECHNICAL BACKGROUND

Press tools or press rings comprising press jaws can be used to press tubular workpieces together to achieve a safe and reliable connection. These type of connections can be used in several fields of applications where it is necessary to interconnect different types of tubes for instance to allow a transport of liquids or gases through the inner cavities of the tubes. For the connection of end portions of tubes, often tubular sleeve-like workpieces are used, which can be made of a metal or any other suitably compressible material and which are put over the respective ends of the tubes to be connected. By applying a radial pressure from the outside, the contact surfaces of the workpiece and the tubes are deformed such that they form a permanent connection and sealing. In general, it is preferred to apply the radial forces in a circumferential homogenous manner to avoid any unevennesses at a surface of the compressed material, since said unevennesses can create weak points in the permanent connection. In the state-of-the-art, a broad variety of different geometries of press tools or press rings are known to achieve such a circumferential homogenous pressure application.

Patent document EP 1 591 176 B1 discloses a press tool including at least two press jaws hinged together to enclose a workpiece such as an inserted pipe end. The press tool also includes an opening area locally located between the at least two press jaws and at least one hinge pin or hinge bolt arranged opposite to the opening area. Further included is a pressing element located adjacent to the at least one hinge pin and arranged to be moved towards the workpiece during a closing of the at least two press jaws.

Patent document EP 1 649 948 B1 relates to a press tool for connecting tubular workpieces, comprising at least two press jaws, which are adjacent to one another in the circumferential direction. The adjacent press jaws are connected directly to one another by means of connecting elements, which are pivotably fastened to two press jaws each, characterized in that the connecting elements have bearing regions at both ends and the press jaws have recesses.

Patent document EP 2 272 629 B1 shows a press tool for connecting in particular tubular workpieces. The press tool comprises a plurality of press elements connected in an articulated, chain-like manner, wherein the press tool is open between two end press elements to form a closing position. Further, the end press elements each comprise a pressing jaw carrier and a pressing jaw, wherein at least one of the pressing jaws is held on the pressing jaw carrier in a displaceable manner. At least one of the pressing jaws of the two end press elements cooperates with a guide element such that, during a pressing operation, the two pressing jaws of the two end press elements are first moved towards each other in a temporally first pressing phase in a compulsory manner irrespective of the friction conditions prevailing between these pressing jaws and the workpiece to be pressed.

According to the state-of-the-art, press rings for providing an evenly distributed force to a tubular workpiece comprise multiple differently shaped and interconnected pressing elements, to provide a more or less complex interaction between the elements during a pressing operation. Further, means which are provided for a reduction of unevenness at the surface of the pressed tubular workpiece usually desire complex mechanical interactions of the respective parts or a provision of additional means. With increasing complexity of the press ring, manufacturing costs increase, whereas robustness of the ring usually decreases. However, less complex press rings tend to not provide a sufficient even force distribution to the tubular workpiece, leading to the above described unevenness and thus negatively affecting lifetime and quality of the created connection.

Thus, it is an objective of the present invention to provide an improved press ring which at least partially solves the above noted problems.

3. SUMMARY OF THE INVENTION

The above objectives are achieved with a press ring according to claim 1 and a method of pressing a tubular workpiece according to claim 15.

The invention relates to a press ring for pressing tubular workpieces, comprising at least two movable press jaws and at least one connecting press jaw connecting the movable press jaws, wherein the movable press jaws are each hinged at their proximal ends to the connecting press jaw by means of respective bolts, so that the distal ends of the movable press jaws can be rotated towards and away from each other to close respectively open the press ring to receive a workpiece therein, and characterized in that the respective bolts are arranged in elongated holes, allowing a translational displacement of the bolts in the elongated holes upon rotating the movable press jaws. The connection between the bolts and the elongated holes are provided such that a movement of the movable press jaws perpendicular to the rotational movement is prevented. Further, rotational movement of the movable press jaws around the bolts only occurs in a plane perpendicular to the extension direction of said bolts. Therefore, sufficient contact must be provided between the outer walls of the bolts and the inner walls of the elongated holes. Thus, the press ring provides a pressing within a defined plane, which can be referred as the pressing plane. It is desired to maintain the pressure forces within said defined plane, in particular when high pressure forces are applied to the tubular workpiece. If a movement of the jaws perpendicular to the pressing plane would occur, proper pressing of the tubular workpiece could not be safeguarded and the risk of damaging either the tubular workpiece or the press ring would arise. The provision of at least three press jaws, including at least two movable press jaws and at least one connecting press jaw (which could also be referred to as a "press jaw carrier" or similar), allows a proper circumferential grabbing of the tubular workpiece with the inner edges or pressing surfaces of the press jaws. Of course, also a larger number of interconnected press jaws can be used in the press ring according to the invention, to achieve a proper pressing. Moving the two distal ends of the movable press jaws towards each other increases the pressure applied from the movable press jaws and the connecting press jaw to the tubular workpiece. By contacting the tubular workpiece from three essentially equally distributed sides along its circumference, a homogeneous application of force can accordingly be ensured. Weak points in the connection between two workpieces usually are at positions where unevennesses or bumps occur during pressing. A reason for this can be an inhomogeneous force application by a press ring which comprises a non-circular inner pressing surface. In state-of-the-art press rings, the force is usually applied by a rotational movement of the press jaws towards the tubular workpiece. Hence, weak points are created where no or less force can be applied to the tubular workpiece. These points usually occur at the portions where the press jaws are interconnected and also at the opening portion of the press ring, where the two distal ends of the movable press jaws contact each other when the press ring is closed. The press ring according to the invention can advantageously provide an additional translational movement of the press jaws to allow a prevention or attenuation of any occurring unevennesses. Said attenuation or prevention of unevennesses is because the final displacement of the press jaws is not caused by a sole rotational movement of the press jaws but it is a combined movement of a rotation of the at least two movable press jaws and a translational movement of the press jaws relative to each other. Hence, the applied forces also comprise a translational component. Accordingly, the additional forces can be applied during the pressing process to the workpiece at the portions of the hinges or at the opening portion of the press ring. Press rings according to the state-of-the-art often require additional means to enable supplying an additional force. Quite contrary, the press ring according to the invention does not require any additional means to create different forces and thus the press ring is self-aligning. The forces applied to move the distal ends of the movable press jaws towards each other are accordingly the only forces needed to create also the translational movement. This simplifies the pressing procedure, which accordingly prevents application errors, and reduces pressing time and costs.

In a preferred embodiment, the jaws are formed such that the bolts are displaced towards the distal ends of the at least two movable press jaws upon closing of the press ring. The skilled person will recognize that the distal ends of the press jaws are the "free" ends opposite to the end with which the movable press jaw is mounted to the connecting press jaw. This mounting end can also be referred to as the proximal end. Movement of the bolts towards the distal ends of the movable press jaws force the connecting press jaw to move in a direction relative towards the distal portions of the movable press jaws. The displacement of the bolts can also provide a pressing force to the tubular workpiece in and against the direction of the distal ends, which could normally not be provided by a simple rotational movement of the movable press jaws. The jaws can be arc shaped, allowing for a smoother contacting of the jaws to the tubular workpiece. The jaws should comprise sufficient mechanical stability such that they do not undesirably deform themselves during the pressing process, even at the portions, where the elongated holes are provided. Thus, the elongated holes must be mechanically sufficiently supported within the jaws such that no deformation, such as twisting or bending motions occur during the rotational and translational movement of the press jaws. Not doing so would result in a non-uniform force distribution and hence lead to the potential risk of malfunctioning and accordingly to damages of the tubular workpiece and/or the press ring and/or a user. In common press rings, insufficient force could be applied to the opening portion, where the two distal ends of the movable press jaws contact each other. That is, the tubular workpiece is contacted and compressed by the press jaws but no additional force can be applied to the opening portion. According to the invention, this can be compensated by a movement of the tubular workpiece in direction of said portion. Accordingly, as discussed above, a homogenous pressure can be applied when the press ring is closed, allowing for an attenuation or prevention of an unevenness at said portion. As noted above, in contrast to press rings according to the state-of-the-art, no additional means are necessary to enable the desired translational movement of the press jaws towards each other.

In another preferred embodiment, the elongated holes are oriented such that the movable press jaws can be rotated relative to the connecting press jaw as well as moved translational relative to the connecting press jaw during closing and opening of the press ring. For a safe and reliable force transmission, a stable rotational and translational movement within a plane is desirable. Hence, the elongated holes are preferably formed in a way that no tilting of the bolts within the elongated holes is possible. According to the invention, the bolts and elongated holes are formed such that the bolts are sufficiently supported by the elongated holes to allow a smooth rotational movement without tilting of the bolts. However, despite their above described guidance, the bolts are still allowed to perform a translational movement along the longitudinal extension direction of the elongated holes. The bolts should comprise a stable fixation with the jaw which carries the bolts. This can be achieved for instance by an integral formation of the bolts with the respective jaw or the bolts can be provided by press-fitting in the bolt carrying jaw. Thus, a stable connection of the connecting press jaw and the movable press jaws can be ensured.

In another preferred embodiment, the respective bolts are freely movable along the longitudinal direction of the elongated hole when the press ring is open and wherein the respective bolts are abutting the respective inner walls of the respective elongated hole proximate to the distal ends of the movable press jaws when the press ring is closed. The ability of a free movement of the bolts in the elongated holes allows a first adjustment of the jaws annealing of the tubular workpiece. The single jaws can be shifted relative to each other such that possible unevennesses of the tubular workpiece can be compensated and a proper initial contact can be provided. Further it can help to compensate for a proper contacting of a tubular workpiece that does not comprise a perfect circular shape, for instance because of a deformation of its surfaces. Closure of the press ring leads to a displacement of the bolt to the very edge in the respective elongated hole until no further translation of the bolt is possible. Thus, in the closed position of the press ring, the bolts experience a maximum of support in the elongated holes. Hence, an application of high pressures is possible without risking a displacement of the bolts within the elongated holes. Further, an undesired back-movement of the bolts is prevented. Hence, only rotational movements of the bolts and accordingly of the movable press jaws are allowed, when the press ring is in the closed condition. Further, the rotational movement is restricted in the closing direction by the contact of the distal portions of the movable press jaws and only a rotational movement in the opposite direction, that is the opening direction, is possible. This facilitates the handling of a press ring according to the present invention. In particular, the open and closed conditions are clearly defined in a way that no undesired movements are possible during the pressing procedure. Hence, also an undesired cant of the press ring with the tubular workpiece is prevented, which could result in damages of the workpiece and the press ring.

In another preferred embodiment, the rotational movement of each of the at least two movable press jaws defines a rotation angle, which increases when the distal ends of the movable press jaws rotate away from each other, wherein the respective bolts are freely movable in the elongated holes when the rotation angle is larger than a closing angle; and wherein the respective bolts are displaced towards the distal ends of the at least two moveable press jaws when the rotation angle is at most a closing angle, wherein the closing angle is at most 30°, preferably at most 15°, even more preferred at most 10° and most preferred at most 5°. The rotation angle lies in the pressing plane that is perpendicular to the rotation axis of the movable press jaws and is defined as zero, when the press ring according to the invention is in a fully closed condition (press jaws contact each other). When the press ring is opened by a rotation of the movable press jaws, the rotation angle for each movable press jaw increases. Thus, the size of the opening between the distal ends correlates with the value of the rotation angle of the movable press jaws. Usually, during pressing operation, a press ring is placed manually around a corresponding tubular workpiece and is initially closed, as far as possible. Herein the respective jaws are put into a first contact with the tubular workpiece. Due to the freely movable bolts, the jaws can be adjusted to a certain extent to allow a proper alignment and thus allow for a proper contact of the tubular workpiece and the pressing surfaces of the press jaws. Since the workpiece usually has an essentially circular shape, both movable press jaws can be essentially equally arranged around the workpiece and thus have essentially the same rotation angle. At the beginning of the pressing operation, the distal ends of the movable press jaws are not in contact with each other and an opening is formed in between. The closing angle is defined as a rotation angle, where the initial closure is completed and, for further closing, additional forces needs to be applied to the press ring by force amplifying means to cause a deformation of the tubular workpiece. These means can be for instance hydraulic, electrical or mechanical means. Since an instant application of high forces can lead to damages at the press ring or the tubular workpiece it can be desired that the forces are applied constant over a certain period to allow a smooth force transmission. Hence, the time for closing the press ring and thus for completing the pressing procedure is significantly dependent on the size of the opening, which is, as described above, defined by the closing angle. Thus, a small closing angle is generally preferred to reduce the time needed to achieve a complete closure of the press ring. The press ring according to the invention allows very small closing angles and thus pressing time can be reduced by up to 50%, compared to common press rings. Thus, an accelerated pressing operation enhances the productivity of a user and also has the advantage that less energy is required.

In another preferred embodiment, the pressing surfaces of the movable press jaws and the connecting press jaw are shaped to form a ring when the press ring is closed and wherein the longitudinal extensions of the elongated holes are oriented essentially perpendicular to the radius of the circular shape of the ring. A circular form of the pressing surfaces is desired since it enables a preferably homogenous force transmission leading to a homogenous connection between multiple workpieces. The longitudinal extensions of the elongated holes are shaped such that a movement of the bolts in said elongated holes leads to a relative movement of the movable press jaws towards the connecting press jaw to achieve an advantageous homogenous force distribution applied to the tubular workpiece. A movement of the bolts essentially perpendicular to the radius essentially allows for a smooth translational movement of the moveable press jaws relative to the connecting press jaw. Further, corresponding jaws can be designed with a reduced width, since the longitudinal extension of the elongated holes essentially follow the circumferential extension direction of the surface of the tubular workpiece and thus the weight of the press ring can be reduced and material costs can be saved.

In another preferred embodiment, receiving means are provided at the distal ends of the at least two movable press jaws adapted to receive means for amplifying the pressing power. As noted above, additional means are usually necessary for a complete closure of the press ring. This closing force is preferably applied to the distal ends of the moveable press jaws. The receive means can comprise for instance protrusions or ledges, extending in radial direction of the press ring, so that any amplified forces could be applied perpendicular to the movement direction of the distal ends of the movable press jaws towards each other during closure of the press ring. The receive means can be integrally formed with the movable press jaws to increase stability or can be separately formed and attached to the distal ends. The receive means can be formed to allow the reception of a broad variety of amplifying means (as e.g. hydraulic pressing tools), which is necessary for instance when different forces are needed to complete pressing procedures using tubular workpieces of different materials.

In another preferred embodiment no additional means, in particular no protrusions are provided at the distal ends of the at least two movable press jaws to contact the tubular workpiece during closure of the press ring. As described above, a weak point with regard to homogenous force application is the opening formed by the two distal ends of the moveable press jaws, moving towards each other. Common press rings usually comprise additional means, protruding for instance at the distal ends in extension direction of the jaws to form a preliminary connection. Thus, on the one hand, they function as guiding means to guide the movement of the two distal ends towards each other and on the other hand they provide a preliminary contact surface for the tubular workpiece. However, the provision of such means, which could be for instance formed as one or multiple fingers and which can interlock with the respective fingers of the respective opposite distal end, increases the complexity of manufacturing such a piece. Further, fragile fingers bear the risk of being deformed during the pressing procedure. Thus, by waiving the provision of such means, the press ring according to the present invention provides the advantages of an increased robustness of the movable press jaw and a facilitated manufacturing thereof.

In another preferred embodiment, the connection between the at least two movable press jaws and the at least one connecting press jaw is established at opposite end portions of the at least one connecting press jaw. The arrangement of the elongated holes at the two opposite ends of the connecting press jaw allows a narrowing of the opening at the distal ends. As described above, a small opening is advantageous since it reduces the time needed to close said opening with force amplifying means. Prior art press rings comprise for instance only two press jaws that are hinged opposite to the opening, which results in a larger opening. The connections can be equally spaced from the opening. Accordingly, the connecting press jaw and the at least two press jaws are equally distributed along the surface of the tubular workpiece and thus allowing a preferably homogenous force transmission leading to an essentially circular compressed workpiece.

In another preferred embodiment, each bolt comprises a recess which comprises a guiding contour; and wherein each elongated hole comprises a driving protrusion, extending towards each bolt; and wherein the driving protrusion is located in the recess when the rotation angle is larger than the closing angle and wherein the guiding contour is formed to guide the driving protrusion and formed to press the driving protrusion against the bolt when the rotation angle is smaller than the closing angle; and wherein the driving protrusion is located outside the recess and pressed against the bolt when the press ring is closed. When the movable press jaw is in an open condition, the driving protrusion can be housed in the recess and the movable press jaw can be freely movable, which includes for instance a rotational movement around the bolts and a translational movement within the pressing plane. The driving protrusion can be provided as an integral part of the inner walls of the surface of the elongated holes or it can be provided as a separate part, arranged such that it protrudes towards the lateral surface of the bolt during pressing operation. When the press ring arrives at the position, where the rotation angle of the movable press jaw becomes at most the closing angle, the protrusion contacts the surface of the bolt and a further closing of the movable press jaw leads to a guidance of the protrusion along the guiding contour. The guiding contour is formed such that the protrusion can apply a force to the bolt which results in a translational displacement of the bolt in the elongated hole. Herein, an increasing pressure can be applied the further the press ring closes, in turn leading to a further translation of the bolt in the elongated hole. Further, the guiding contour can be formed that the protrusion is guided outside the recess, when the press ring arrives at its fully closed position. At this point a maximum force is applied to the bolt which accordingly forces the bolt towards its final position where it abuts the inner surface of the elongated hole, proximate to the distal ends of the movable press jaw. The protrusion and the recess can also be shaped in a way that the protrusion is not guided outside the recess when the press ring is in its fully closed condition. The pressure of the protrusion holds the bolt in place such that no translational backwards movement is possible. It is also possible that the protrusion can be formed such that it also comprises a respective guiding contour which is adapted to engage with the opposite guiding contour of the recess to allow a smooth guidance of the protrusion in the recess. The protrusion can also be a driving bolt, partially located in a respective hole located adjacent to the elongated hole. This has the advantage of a simple manufacturing of the elongated holes since the elongated hole can simply be milled into the press jaw.

In another preferred embodiment, only a part of the length of the bolt is provided with the recess. The recess must not necessary be provided over the whole length of the bolt. It can be advantageous to only provide the recess at a portion of the bolt, for instance at the top portion, where the respective protrusion is provided and should be housed. Further, the protrusion might also not be provided over the whole length of the inner wall of the elongated hole but only at the portion where the recess of the bolt is provided. This increases guidance of the bolt and the hole in the area where no recess and protrusion is provided. In particular, in the portion, where no protrusion or recess are provided, stability of the bolt-hole connection can be increased since the contact is established at a larger surface during a rotational movement of the movable press jaws.

In another preferred embodiment, the bolts are formed as separate parts and affixed to the corresponding jaw or wherein the bolts and the corresponding jaws are integrally formed. An integral formation of the bolts leads to a higher resistance against mechanical stresses, which occur during the pressing operation. However, it is also possible to produce the bolts as separate parts and affix them to the corresponding jaw, for instance by press-fitting them into respective holes of the press jaw, which are correspondingly formed to house the bolts. This has the advantage that both parts, the bolts and the jaws, can be produced as less complex parts, which reduces manufacturing costs. Further, a separate exchange of any damaged or worn out parts can be enabled.

In another preferred embodiment, all parts of the press ring can be produced by milling. The press ring according to the present invention comprises a simple design, wherein only a few parts are necessary to transfer high pressing forces to a workpiece in a homogenous manner. Hence, the jaws can simply be produced at common milling machines and the bolts can be produced at automatic lathes. The so achieved reduced complexity of all parts not only reduces the manufacturing costs, it also facilitates the assembly of the press ring. Even further, the press ring according to the invention comprises an increased resistance against pollution and no extensive cleaning is needed to maintain the press ring fully functional. Since no covered surfaces are provided in the press ring any polluting parts, such dust or dirt, can simply fall out the press ring. This improves safety of the usage and increases the durability of the press ring.

In another preferred embodiment, the at least two movable press jaws are identically formed. The design further allows that the movable press jaws can be produced as completely identical parts, since the same movable press jaw can be used to function as one of the at least two movable press jaws by a simple, mirror inverted assembly of the respective press jaw. Hence, a production of the single parts can be performed very cost effective and replacement of a movable press jaw is facilitated.

Further, the invention relates to a method of pressing a tubular workpiece with a press ring according to the invention. As already discussed above, a pressing operation utilizing the press ring according to the invention is very time efficient. It can allow a halving of the time needed to perform the pressing because of the small closing angle. Further the displacement of the at least two movable press jaws relative to the at least one connecting press jaw in direction of the distal ends leads to a significant reduction of embossments at the area of the hinges and the area of the opening of the press ring because of a homogenous force distribution, when the press ring is driven into closed condition. Further the method according to the invention only requires to rotate the distal ends of the movable press jaws towards each other to acquire a proper pressing. During pressing no further alignment of the press ring and/or the tubular workpiece are needed as the press ring is self-aligning during the pressing operation.

4. DESCRIPTION OF THE DRAWINGS

For a better understanding of the present invention and to appreciate its practical applications, the following figures are provided and referenced hereafter. It should be noted that the figures are given as examples only and in no way limit the scope of the invention.

5. DESCRIPTION OF PREFERRED EMBODIMENTS

In the following the present invention will now be described in more detail hereinafter with reference to the accompanying figures, in which exemplary embodiments of the invention are illustrated. However, the present invention may be embodied in different forms and should not be construed as limited to the embodiments set forth herein. Rather, these examples are provided so that this disclosure will be thorough and will convey the scope of the invention to persons skilled in the art. In the figures, the same reference signs refer to the respective same features.

Figure 1:
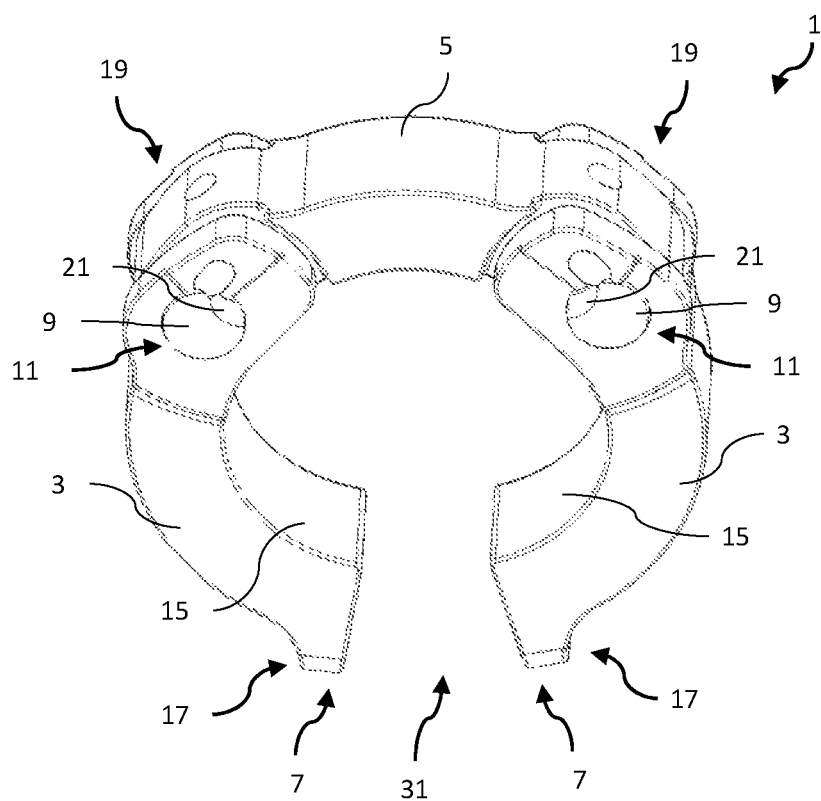
FIG. 1 shows a three-dimensional top view of a press ring of one embodiment according to the invention in open condition.

FIG. 1 shows the press ring 1 in a three-dimensional top view in an open condition. The press ring 1 comprises two movable press jaws 3 connected to a connecting press jaw 5 at the proximal ends 7 of the connecting press jaw 5. The inner surfaces of the jaws form a pressing surface 15, which can contact a tubular workpiece (not shown) to be pressed, which can be arranged in the press ring 1. The bolts 9 extend perpendicular to the extension direction of the press jaws. In the depicted embodiment, the bolts 9 are connected to the connecting press jaw 5. The elongated holes 11 are provided at the proximal ends of each movable press jaw 3 to house the bolts 9. The bolts 9 are freely movable within the elongated holes 11, such that the movable press jaws 3 can be rotated around the axes of the bolts 9 and can also be translationally shifted in the longitudinal direction of the elongated holes 11. The rotational movement of the movable press jaws 3 around the bolts 9 is limited to a movement within a plane, which can be referred as the pressing plane. In open condition, the press ring 1 forms an opening 31, at the distal ends 7 of the movable press jaws 3. The distal ends 7 of the movable press jaws 3 also comprise receiving means 17 for receiving force amplifying means 39. As shown in the figure, the two movable press jaws 3 are identically formed and only assembled mirror inverted to the connecting press jaw 5.

Figure 2:
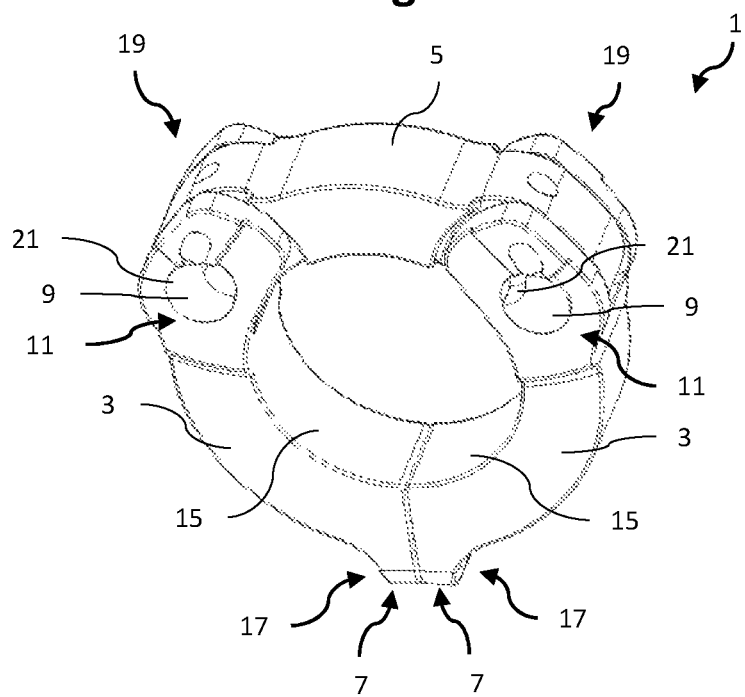
FIG. 2 shows a three-dimensional top view of a press ring of one embodiment according to the invention in closed condition.

FIG. 2 shows the press ring 1 in closed condition. Herein, the distal ends 7 were moved towards each other until the flat portions of the distal ends 7 of the movable press jaws 3 are in contact. The pressing surfaces 15 form a continuous ring. Usually a tubular workpiece, which is initially received by the press ring 1 has a diameter larger compared to the diameter of the ring of the closed press ring 1. Thus, the surface of the tubular workpiece is compressed and can be deformed and a connection between overlapping surfaces of a first tubular workpiece and a second tubular workpiece can e.g. be established by pressing the first tubular workpiece equally by the pressing surfaces 15. During the pressing, the bolts 9 are shifted in the elongated holes 11 towards the distal ends 7 of the movable press jaws 3. Hence, the movable press jaws 3 are moved translationally towards the connecting press jaw 5. This translational movement provides additional pressing forces, which attenuate unevennesses and deformations of the tubular workpiece that can occur at the hinge portions of the press ring 1 and the opening 31, where the distal ends move towards each other during the pressing process. The recess 21 is only provided at a portion of bolt 9 where it faces a driving protrusion 25 of the inner surface of the elongated hole 11, e.g. only in the upper part of the bolt 9.

Figure 3:
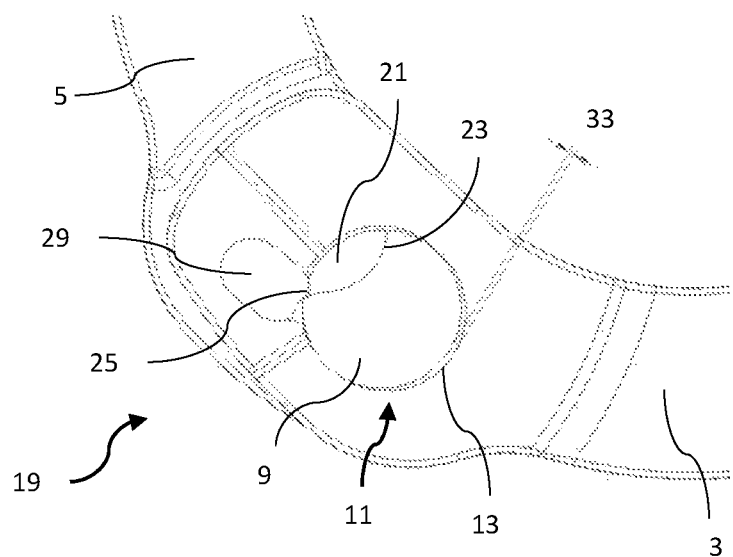
FIG. 3 shows an enlarged top view of the connection between a movable press jaw and a connecting press jaw, when the press ring is in open condition.

FIG. 3 shows an enlarged top-view of one connection portion of the press ring 1, when the press ring 1 is in an open condition. The bolt 9 is affixed to the connecting press jaw 5 at the end portion 19 of the connecting press jaw 5 (i.e. at the proximal end) and extends perpendicular to the extension direction of the connecting press jaw 5. Further, the bolt 9 is press-fitted into a respective hole, provided at the connecting press jaw 5 and the bolt 9 is thus accordingly affixed to the connecting press jaw 5. Alternatively, it can also be integrally formed with the connecting press jaw. The movable press jaw 3 comprises an elongated hole 11, which snuggly receives bolt 9. Further, a driving protrusion 25 is provided, which extends towards the bolt 9. The driving protrusion 25 is formed by a driving bolt 29, which is press fitted into a hole of the movable press jaw 3 and thus the driving bolt 29 is affixed to the movable press jaw 3. Thus, the driving protrusion 25 is moved together with the movable press jaw 3. When the press ring 1 is in an open condition, as shown in FIG. 1, the driving protrusion 25 is partially housed in recess 21 of the bolt 9. The recess 21 comprises a guiding contour 23 along which the driving protrusion 25 can be guided during the pressing operation. The bolt 9 can be moved translational along the elongated hole 11 and rotational around the axis of the bolt 9. As shown, the bolt 9 does not contact the inner wall 13 proximate to the distal end 7 of the movable press jaw 3. Hence, a gap 33 is provided between the outer surface of the bolt 9 and the inner distal wall 13 of the elongated hole 11.

Figure 4:
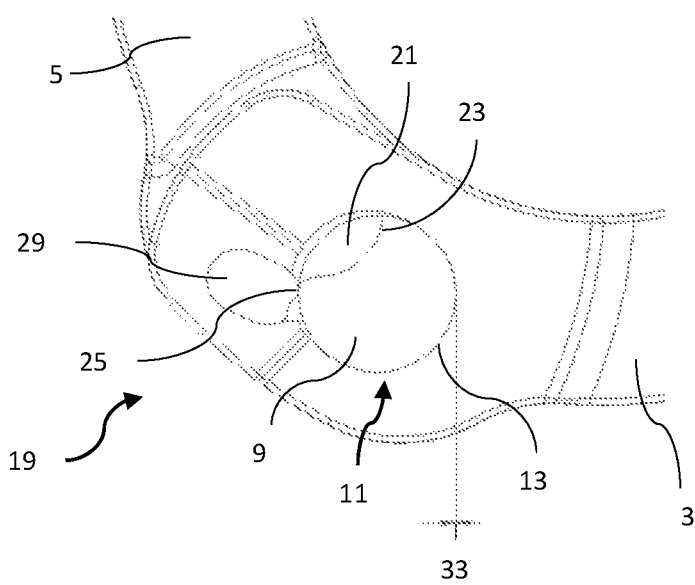
FIG. 4 shows an enlarged top view of the connection between a movable press jaw and a connecting press jaw, when the press ring is in closed condition.

FIG. 4 shows an enlarged top-view of one connection portion of the press ring 1, when the press ring 1 is in a closed condition. The movable press jaw 3 is rotated and accordingly also the affixed driving protrusion 25 is rotated with it, such that the driving protrusion 25 is not housed in the recess 21 of the bolt 9. When rotating the press jaw 3 from the open to the closed condition, the driving protrusion 25 is guided along the guiding contour 23, and thereby pushes the bolt 9 in a translational movement along the elongated hole 11 in direction towards the inner wall 13 towards the distal end 7 of the movable press jaw 3. When the press ring 1 is fully closed, the bolt 9 is firmly pressed by the driving protrusion 25 against the inner wall 13 so that essentially no gap 33 is present, as shown in FIG. 4. Hence the bolt 9 is completely supported by the inner wall 13 of the elongated hole 11, which stabilizes the bolt 9 in the elongated hole 11 at a point during the pressing operation, where usually the highest pressure occurs. A further movement of the movable press jaw 3 is limited to a rotation in the opening direction, since neither translational movement nor further rotational movement towards the closing direction is possible. The limitation of translational movement is provided until the driving protrusion 25 is guided back into the recess 22 of the bolt 9.

Figure 5:
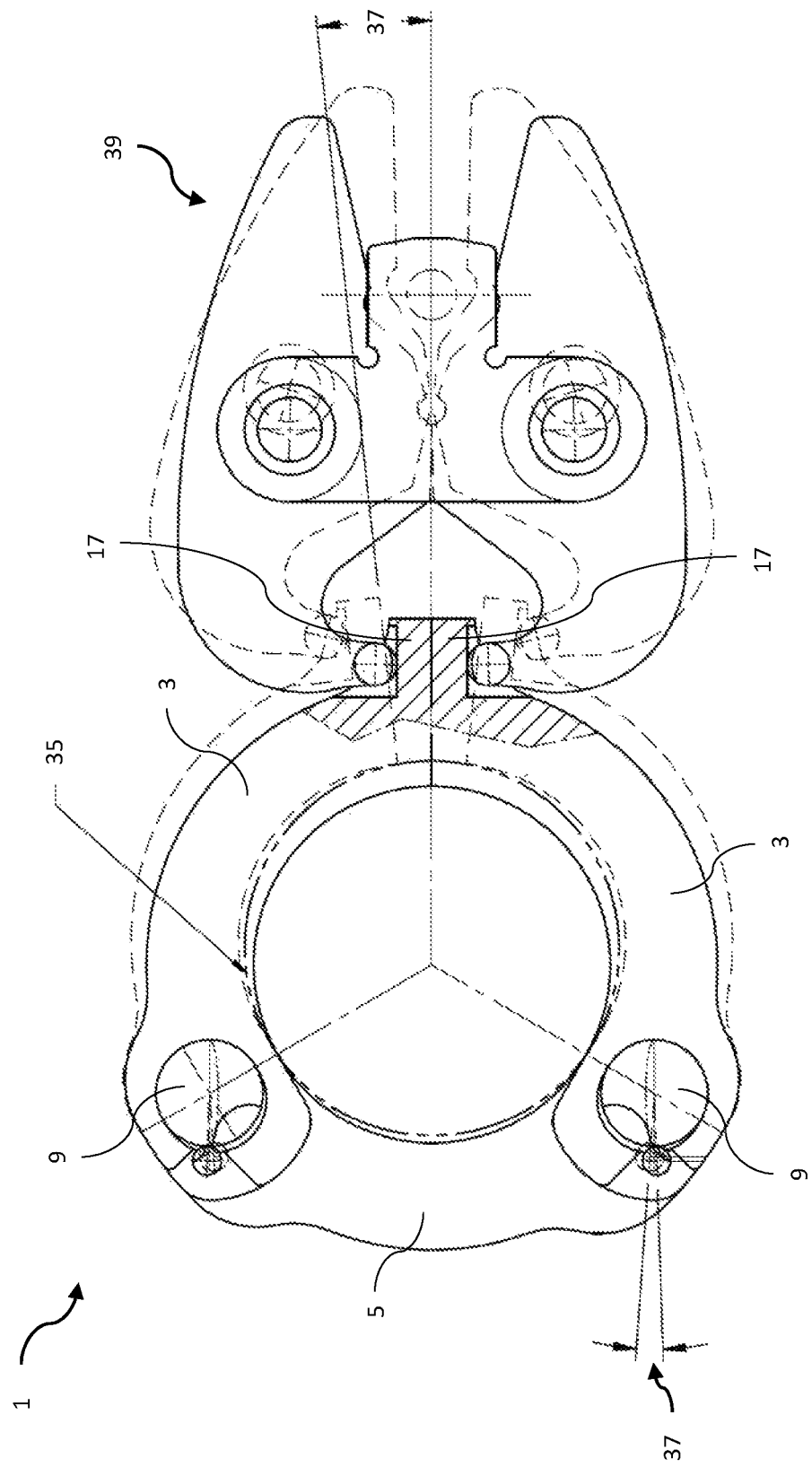
FIG. 5 shows a top view of a press ring of one embodiment according to the invention in open and closed condition with attached force amplifying means.

FIG. 5 shows a top view of press ring 1 according to the invention in open (dashed lines) and closed condition (solid lines) with engaged force amplifying means 39. The force amplifying means 39 can e.g. be a part of an electric or hydraulic actuated pressing device. The dashed lines depict the pressing assembly comprising the press ring 1 and the amplifying means 39 in an open condition, whereas the solid lines depict the pressing assembly in a closed condition. The force amplifying means 39 engage press ring 1 at the receiving means 17 at the distal ends 7 of the movable press jaws 3 and force the distal ends 7 towards each other. The rotation of the movable press jaws 3 occurs around the bolts 9. As mentioned above, in an open condition, the press ring 1 comprises an opening 31 to receive a workpiece therein, such as e.g. a crimp connector. The size of the opening 31 is defined by a rotation of the movable press jaws 3 about a rotation angle 37 away from their positions when the press ring 1 is in a closed condition. The rotation angle 37 is denoted as the closing angle, when the pressing surface 15 of the respective press jaw contacts the tubular workpiece, such that no further closing is possible without using the force amplifying means 39. A tubular workpiece 35, such as a pipe, tube, crimp connector etc., is inserted into the press ring 1 at its open position or the press ring 1 is arranged around the tubular workpiece 35. The tubular workpiece 35 can comprises a large diameter and can also be slightly elliptic (see semi-dashed line). Once the press ring 1 is closed, the tubular workpiece 35 is pressed by the pressing surface 15 of the connecting press jaw 5 to provide a homogenous force transmission and thus a resulting approximately circular appearance of the compressed workpiece. The diameter of the tubular workpiece 35 after compression is accordingly reduced, compared to the diameter in the uncompressed state.

REFERENCE SIGNS press ring 1
movable press jaw 3
connecting press jaw 5
distal end 7
bolt 9
elongated hole 11
inner wall 13
pressing surface 15
receiving means 17
connecting press jaw end portion 19
recess 21
guiding contour 23
driving protrusion 25
driving bolt 29
opening 31
gap 33
tubular workpiece 35
rotation angle 37
force amplifying means 39

The invention claimed is:

1. A press ring for pressing tubular workpieces, comprising:
at least two movable press jaws, wherein each movable press jaw has a proximal end and a distal end, and wherein the proximal end of each movable press jaw defines an elongated hole; and
at least one connecting press jaw connecting the movable press jaws;
wherein the movable press jaws are each hinged at their proximal ends to the connecting press jaw by respective bolts, wherein each bolt defines an axis, so that the distal ends of each of the movable press jaws can be rotated about a respective one of the axes towards and away from each other, to receive a workpiece therebetween and to close and open the press ring respectively, and
wherein each bolt is arranged in a respective one of the elongated holes, allowing a translational displacement of the bolts in the elongated holes relative to an associated one of the movable press jaws upon rotation of the at least one of the at least two movable press jaws about a respective one of the axes.

2. The press ring according to claim 1, wherein the bolts are displaced towards the distal ends of the at least two movable press jaws upon closing of the press ring.

3. The press ring according to claim 1, wherein the elongated holes are oriented such that at least one of the at least two movable press jaws can be rotated about the associated one of the axes relative to the at least one connecting press jaw as well as moved translationally relative to the at least one connecting press jaw during closing of the press ring.

4. The press ring according to claim 1, wherein each elongated hole defines an inner wall, wherein each one of the bolts is freely movable along each associated one of the axes relative to an associated one of the elongated holes when the press ring is open and wherein each one of the bolts is abutting the respective inner wall of an associated elongated hole proximate to the distal ends of the at least two movable press jaws when the press ring is closed.

5. The press ring according to claim 1, wherein rotational movement of each of the at least two movable press jaws about an associated one of the axes defines a rotation angle, which increases when the distal ends of the movable press jaws rotate away from each other, wherein the respective bolts are freely movable in the elongated holes when the rotation angle is larger than a closing angle, wherein the respective bolts are displaced towards the distal ends of the at least two moveable press jaws when the rotation angle is at most a closing angle, and wherein the closing angle is at most 30°.

6. The press ring according to claim 5 wherein the closing angle is at most 15°.

7. The press ring according to claim 6 wherein the closing angle is at most 10°.

8. The press ring according to claim 7 wherein the closing angle is at most 5°.

9. The press ring according to claim 5, wherein each bolt comprises a recess which comprises a guiding contour,
wherein each elongated hole comprises a driving protrusion extending towards each bolt,
wherein the driving protrusion is located in the recess when the rotation angle is larger than the closing angle and
wherein the guiding contour is formed to guide the driving protrusion and formed to press the driving protrusion against the bolt when the rotation angle is smaller than the closing angle, and
wherein the driving protrusion is located outside the recess and pressed against the bolt when the press ring is closed.

10. The press ring according to claim 9, wherein only a part of the length of the bolt is provided with the recess.

11. The press ring according to claim 1, wherein each of the movable press jaws defines a pressing surface, and wherein the pressing surfaces of the at least two movable press jaws are shaped to form a circular ring when the press ring is closed and wherein the elongated holes are oriented substantially perpendicular to the radius of the circular ring.

12. The press ring according to claim 1, wherein no additional means are provided at the distal ends of the at least two movable press jaws to contact the tubular workpiece during closure of the press ring.

13. The press ring according to claim 12 wherein the distal ends of the at least two movable press jaws are free of protrusions.

14. The press ring according to claim 1, wherein the connection between the at least two movable press jaws and the at least one connecting press jaw is established at opposite end portions of the at least one connecting press jaw.

15. The press ring according to claim 1, wherein the bolts are formed as separate parts and affixed to the corresponding jaw.

16. The press ring according to claim 1, wherein the bolts and the corresponding jaws are integrally formed.

17. The press ring according to claim 1, wherein all parts of the press ring are produced by milling.

18. The press ring according to claim 1, wherein the at least two movable press jaws are identically formed.

19. A method of pressing a tubular workpiece with a press ring, the method comprising:
  providing a press ring for pressing tubular workpieces, the press ring including at least two movable press jaws, wherein each movable press jaw has a proximal end and a distal end, and wherein the proximal end of each movable press jaw defines an elongated hole, and at least one connecting press jaw connecting the movable press jaws,
  wherein the movable press jaws are each hinged at their proximal ends to the connecting press jaw by respective bolts, wherein each bolt defines an axis, so that the distal ends of each of the movable press jaws can be rotated about a respective one of the axes towards and away from each other, to receive a workpiece therebetween and to close and open the press ring respectively, and
  wherein each bolt is arranged in a respective one of the elongated holes, allowing a translational displacement of the bolts in the elongated holes relative to an associated one of the movable press jaws upon rotation of the at least one of the at least two movable press jaws about a respective one of the axes;
  placing a tubular workpiece between the movable press jaws;
  closing the press ring to thereby press the tubular workpiece.

* * * * *